(12) United States Patent
Affleck et al.

(10) Patent No.: US 7,537,122 B2
(45) Date of Patent: May 26, 2009

(54) METHOD AND APPARATUS FOR MOVING AGRICULTURAL COMMODITIES

(75) Inventors: Sheldon Affleck, Regina (CA); Lavern Affleck, Regina (CA)

(73) Assignee: Mobil Grain Ltd., Regina, Saskatchewan (CA)

( * ) Notice: Subject to any disclaimer, the term of this patent is extended or adjusted under 35 U.S.C. 154(b) by 283 days.

(21) Appl. No.: 11/316,201

(22) Filed: Dec. 21, 2005

(65) Prior Publication Data
US 2006/0192041 A1 Aug. 31, 2006

(30) Foreign Application Priority Data
Dec. 22, 2004 (CA) .................................. 2490973

(51) Int. Cl.
*B07B 1/00* (2006.01)
(52) U.S. Cl. ................. 209/233; 209/236; 209/309; 47/901
(58) Field of Classification Search ............. 209/233, 209/236, 93; 47/901
See application file for complete search history.

(56) References Cited

U.S. PATENT DOCUMENTS

| 3,463,314 | A | * | 8/1969 | Feterl ..................... 209/254 |
| 3,672,505 | A | * | 6/1972 | Feterl ..................... 209/264 |
| 2005/0004682 | A1 | * | 1/2005 | Gaddis et al. ............... 700/9 |
| 2008/0034652 | A1 | * | 2/2008 | Hunter et al. ........... 47/58.1 R |

* cited by examiner

*Primary Examiner*—Patrick H Mackey
*Assistant Examiner*—Terrell H Matthews
(74) *Attorney, Agent, or Firm*—Patterson, Thuente, Skaar & Christensen, P.A.

(57) ABSTRACT

A portable processing plant apparatus is transported to a location convenient to a freight supplier or like destination and then set up to receive gross agricultural commodities and discharge clean agricultural commodities into a clean commodity receptacle, such as a rail car. A batch of commodity from a farm location is received into a storage bin. The batch is conveyed in a stream through a gross scale, cleaning module, and net scale and into a receptacle, such as a rail car. A gap is created between the stream of one batch and the stream of the next, and a computer is operative to control flow of the commodity streams. The computer can store batch identity information, and record the source farm location of the commodity in each receptacle.

14 Claims, 7 Drawing Sheets

METHOD AND APPARATUS FOR MOVING AGRICULTURAL COMMODITIES

REFERENCE TO RELATED APPLICATION

This application claims priority to Canadian Serial No. 2,490,973 filed Dec. 22, 2004, which is hereby incorporated by reference.

This invention is in the field of agricultural commodities, and particular systems for moving such commodities from the farm into a commercial chain to market.

BACKGROUND

Typically in Canada, agricultural commodities such as grains, beans, peas, and the like, once harvested, are farm stored in bins on the farmers land, and transported to permanent commercial bulk handling facilities when storage space and suitably attractive commercial purchase contracts are available. The commodity is transferred into the commercial facility and combined with other similar commodity in large bulk storage bins.

The quality of any given batch of such commodities will vary. In the commodity industry, the quality of any particular batch of a commodity is indicated by assigning the batch a grade, for example #1, #2, #3 and so on, with lower numbers indicating higher quality. Such grading will be based on different factors for different commodities, and typically considers grading factors such as color, staining, disease, plumpness of kernels, weight per unit of volume (bushel weight), and the like.

Similarly cracked seeds, weed seeds, and foreign material are present in any given batch of a commodity in varying amounts, and is typically referred to as dockage. Dockage includes anything that must be cleaned out of the batch in order to bring it up to a standard that is fit for a particular market. Generally a small percentage of dockage is allowed in a commodity, but anything in excess of that must be cleaned out. This dockage that is cleaned out of a commodity has a much reduced value compared to the commodity from which it derives.

Conventionally, grade and dockage are determined by taking representative samples of the commodity batch, reducing such sample to a lab sized volume (generally less than 1 kg) and manually separating and measuring and appraising the pertinent components and attributes. The whole batch is then presumed to be of the determined grade and contain that percentage of dockage.

Where for example the gross weight of a commodity batch is 100 tons, and where the sample is graded as #2 dark northern wheat with 13.5% protein, and is determined to contain 3% dockage, the commercial facility will give the farmer a receipt showing a net delivery of 97% of 100 tons, or 97 tons of #2 dark northern wheat with 13.5% protein. In some commercial facilities, and with some commodities, the farmer may also be compensated for the 3 tons of dockage, and in others the dockage is not further considered as part of the transaction.

The grade and dockage of the sample may be determined by facility personnel, or by an independent third party either at the facility or at a remote location where the sample is sent. The farmer receives payment for each batch of commodity on the basis of the grade and dockage of the sample.

Once the batch of commodity is delivered to the commercial facility, the batch has entered the commercial chain and is no longer identified with the farmer or segregated by origin. The farmer has only the receipt showing the grade and net quantity delivered. At that point the farmer can sell the grain represented by the receipt, either immediately or at a later date. If he delays sale, the commercial facility may levy a storage charge which will be deducted from the future sale.

This loss of identity is becoming problematic. The trend in food supply chains is toward providing traceability of food products so that where a problem is discovered by an end-user, the source of the food product can be traced right back to the farm it was grown on. Traceability and identity preservation are not provided by conventional commercial facilities where commodities delivered thereto are mixed together. Providing identity preservation and traceability can add value to the commodity for certain end-users.

Typically once in the commercial facility, the grain will be stored for some time until a sufficient quantity of a particular commodity, or grade of a commodity, is assembled in the facility to warrant shipment. At that time the commodity will be transferred from the commercial facility to a transport vehicle for movement farther down the commercial chain, either directly to an end user, or often to a coastal commercial facility where the commodity will eventually be transferred to a ship for carriage overseas.

At some point after entering the commercial chain by delivery from the farm to a commercial facility, the dockage will be removed from the raw commodity. Historically in many areas, the initial delivery of raw grain was commonly made at a small local commercial facility or primary elevator that did not have the equipment required to remove dockage. The raw grain was shipped, typically by rail, to larger facilities or terminals for dockage removal. These terminals were often located on a coast where the commodity was to be exported overseas. More recently the trend has been to close and tear down these small primary elevators in favor of large commercial elevators or inland terminals.

These inland terminals enjoy economies of scale with respect to personnel, facility maintenance, and the like, and more particularly with respect to rail transport. Considerable savings in freight costs are available when a railway can deliver rail cars in lots of fifty or a hundred to a single location, and then take away the loaded cars within a short time, perhaps 24 hours or less. For many farmers however, the distance required to transport a commodity to these commercial terminals is considerably increased compared to the smaller local facilities, and the total transportation costs from farm to market continue to increase.

Many of these inland terminals include processing and cleaning equipment capable of removing dockage. As well as removing dockage the equipment may also be used for product sizing and product density separation. Product sizing can be required to meet contractual standards. For example a pea contract may specify a minimum seed size like $15/64$ of an inch, or a grade improvement could result from removing small slender seeds that have been affected by drought or frost. Separation by density can remove more subtle variances caused by frost or heat stress, and upgrade the commodity.

The processing and cleaning equipment required for high capacity removal of dockage, such as is required in an inland terminal, is quite large and cumbersome, and relatively expensive. Such equipment typically includes rotating indents, and vibrating sieves and must be anchored to a concrete foundation in order to provide satisfactory operation, and to prevent the vibrations from one machine from affecting the operation of another. The equipment must also be maintained in a level orientation in order to allow proper flow of a commodity through the equipment and satisfactory operation. Because of these operational requirements, the equipment is not conventionally made portable.

Commodities other than traditional grains, such as peas, beans, lentils, and the like, have become increasingly popular in many areas in recent times, and often an entirely separate chain of commercial facilities has developed to receive these special crop commodities from the farmer and move them to various markets, often overseas. The general concept and process has, however, stayed basically the same.

When a farmer decides he would like to deliver some commodity, he will generally contact one or more commercial facilities to determine their pricing and delivery options. As well, he will most probably take a sample to one or more of these commercial facilities to see how each facility grades the sample and determines the dockage. The commercial facility itself is paid on the actual grade and net commodity delivered to its customer, and so must take care to ensure that overall, they are buying within a range that will result in a profit when they in turn sell the commodity.

Generally a farmer with a sample will be advised of a grade and dockage for the sample, however it is not possible to guarantee any such parameters for a truckload or bin full of the commodity based on the sample, since often the offered sample or sample taken on delivery is not accurately representative of the delivered commodity. The relationship between the sample and the commodity batch from which it is taken can be viewed with suspicion by the farmer, and can be a contentious issue in the conventional system since in the majority of transactions, all payments to the farmer are based on the sample.

In the conventional system for moving agricultural commodities from farm to market, considerable time elapses between delivery of the commodity from the farm to a commercial facility, and eventual use by a consumer. Some progress has been made to implement "just in time" delivery from the farm to commercial facilities. Commercial facilities often attempt to determine what commodities are available in their trading area, and then schedule deliveries from farmers to correspond to shipment schedules, however the difficulties inherent in accurate scheduling and execution of the schedule result in large volumes of the commodity being stored in the facility for considerable length of time and involving large inventory costs and storage risks.

Typically a farmer will need to be paid for the delivered commodity when delivered, or at least within a few days after delivery. In addition to the cost of building and maintaining the commercial facilities, a large component of the cost of the conventional commodity movement system results from the commercial operator owning the commodity from the time the farmer delivers it until the time the commercial operator receives payment, a period that is often measured in weeks.

Financing is also required to cover the period between paying to the farmer and receipt of payment from the purchaser. This is particularly significant for smaller operators of commercial facilities that handle special crops like peas, beans, lentils, and the like. Since the value of a commodity can vary greatly depending on grade and dockage, financial institutions are commonly very conservative lenders with respect to both terms and collateral when financing bulk raw unshipped commodities.

SUMMARY OF THE INVENTION

It is an object of the present invention to provide a method and apparatus for moving commodities from the farm into a commercial market chain that overcomes problems in the prior art.

In a first embodiment the invention provides a portable processing plant apparatus for receiving gross agricultural commodities and discharging clean agricultural commodities into a clean commodity receptacle. The apparatus, when set up in an operating position, comprises a receiving station operative to receive a gross commodity from a truck. A first conveyor is operative to convey gross commodity from the receiving station to a selected one of first and second storage bins. A second conveyor is operative to convey gross commodity in a gross commodity stream from a selected storage bin to a receiver of a gross commodity scale operative to weigh the gross commodity stream as same moves from the receiver to a gross scale discharge. A third conveyor is operative to convey the gross commodity stream from the gross scale discharge to a receiver of a cleaning module operative to remove dockage from the gross commodity stream and discharge a clean commodity stream at a cleaner discharge thereof and discharge a dockage stream at a dockage discharge thereof. A fourth conveyor is operative to convey the clean commodity stream from the cleaner discharge to a receiver of a net commodity scale operative to weigh the clean commodity stream as same moves from the receiver to a net scale discharge. A fifth conveyor is operative to convey the clean commodity stream from the net scale discharge to the clean commodity receptacle, and a dockage bin is connected to receive dockage from the dockage discharge. A computer is operative to control flow of a first gross commodity stream from the first storage bin and flow of a second gross commodity stream from the second storage bin to create a gap between a rear end of the first gross commodity stream and a front end of the second gross commodity stream. The apparatus is movable from the operating position to a transport position supported on wheels for movement along the ground.

In a second embodiment the invention provides a method for purchasing like gross agricultural commodities from a plurality of farm locations and delivering clean agricultural commodities into a plurality of clean commodity receptacles for delivery to an end user while preserving the identity of the source farm location of the clean agricultural commodity in each clean commodity receptacle, the method comprising:

a) contracting purchase of like gross commodities from at least first and second farmers at corresponding first and second farm locations;

b) selecting a temporary plant location convenient to the farm locations and for delivery to the end user, and setting up a processing plant adjacent to the clean commodity receptacles;

c) transporting a first batch of gross commodity from the first farm location to a receiving station of the processing plant;

d) receiving the first batch of gross commodity from the first farm location and transferring the first batch from the receiving station to a first storage bin;

e) transporting a second batch of gross commodity from the second farm location to the plant receiving station and receiving and transferring the second batch to a second storage bin;

f) initiating transfer of the first batch, in a first gross commodity stream having a front end and a rear end, from the first storage bin to the receiver of a gross commodity scale, weighing the first gross commodity stream as same passes through the gross commodity scale, and discharging the first gross commodity stream through a gross scale discharge;

g) conveying the first gross commodity stream from the gross scale discharge to a receiver of a cleaning module, removing dockage from the first gross commodity stream as same passes through the cleaning module, and discharging a first clean commodity stream at a cleaner discharge and discharging a dockage stream at a dockage discharge;

h) conveying the first clean commodity stream to a receiver of a net scale, weighing the first clean commodity stream as same passes through the net scale, and discharging the first clean commodity stream through a net scale discharge;

i) conveying the first clean commodity stream from the net scale discharge to at least one selected clean commodity receptacle;

j) conveying the dockage stream to a dockage bin;

k) when the rear end of the first clean commodity stream has entered the at least one selected clean commodity receptacle, determining a weight of the first clean commodity stream and paying the first farmer for the first batch of gross commodity according to the weight of the first clean commodity stream;

l) recording in a computer memory the at least one selected clean commodity receptacle as containing the determined weight of clean commodity from the first farm location;

m) after the rear end of the first clean commodity stream has entered the receiver of the gross commodity scale, repeating steps g) through l) for the second gross commodity stream.

In a third embodiment the invention provides a portable commodity cleaning apparatus operative to receive a gross commodity stream and operative to discharge a clean commodity stream and a dockage stream. The apparatus comprises a plurality of cleaning mills operating in parallel, each cleaning mill mounted on a frame and a dampening and ballasting concrete slab mounted in each frame. A distributor is mounted above the cleaning mills and is operative to receive the gross commodity stream and direct a portion of the gross commodity stream into each cleaning mill. The apparatus is configured such that when in the operating position the frames and distributor are isolated from each other, and such that the apparatus is movable to a transport position supported on wheels.

The method provided by the invention typically moves a batch of a commodity from a farm location to a processing location adjacent to an outbound freight supplier, such as a railway line, barge port, marine container yard, or intermodal container yard, and provides the processing, grading, weighing and loading functions at the time of delivery, while maintaining the identity and source of the products and making such records available onwards in the supply chain. Payment can be made to the farmer at anytime after the dockage is removed, based on actual net weight of the clean commodity in the batch with dockage removed rather than a sample of the batch.

Typically a string of 50 to 100 rail cars will be loaded at the processing location. Contracts to purchase of the required amount of commodities to fill the string are arranged with farmers located in an area, and the processing location is chosen based on the farm location of the commodities contracted and based on suitable sites centrally located with respect to the farms. Many older grain elevators have been torn down, and for example vacant land can generally be found adjacent to a railway that will provide a suitable processing location where shipping is by train. The outbound freight mode (i.e. rail cars, marine containers, or intermodal containers) is scheduled for arrival at the processing location on a delivery date, and trucks are contracted to transport the commodities to the processing location. The number of trucks required will be determined based on the distance from the farm locations to the processing location, the amount of commodity at each farm location, road conditions, and like factors with the object that the trucks will be coordinated to substantially maintain a steady flow of commodity from the farm locations to the processing location.

The plant components are designed for portability and ease of set up in varying terrain, such as abandoned lots adjacent to railways. The cleaning module includes a number of cleaning mills set up to work in parallel for increased capacity, and vibrationally dampened and isolated from each other so that vibrations are not transferred between mills.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
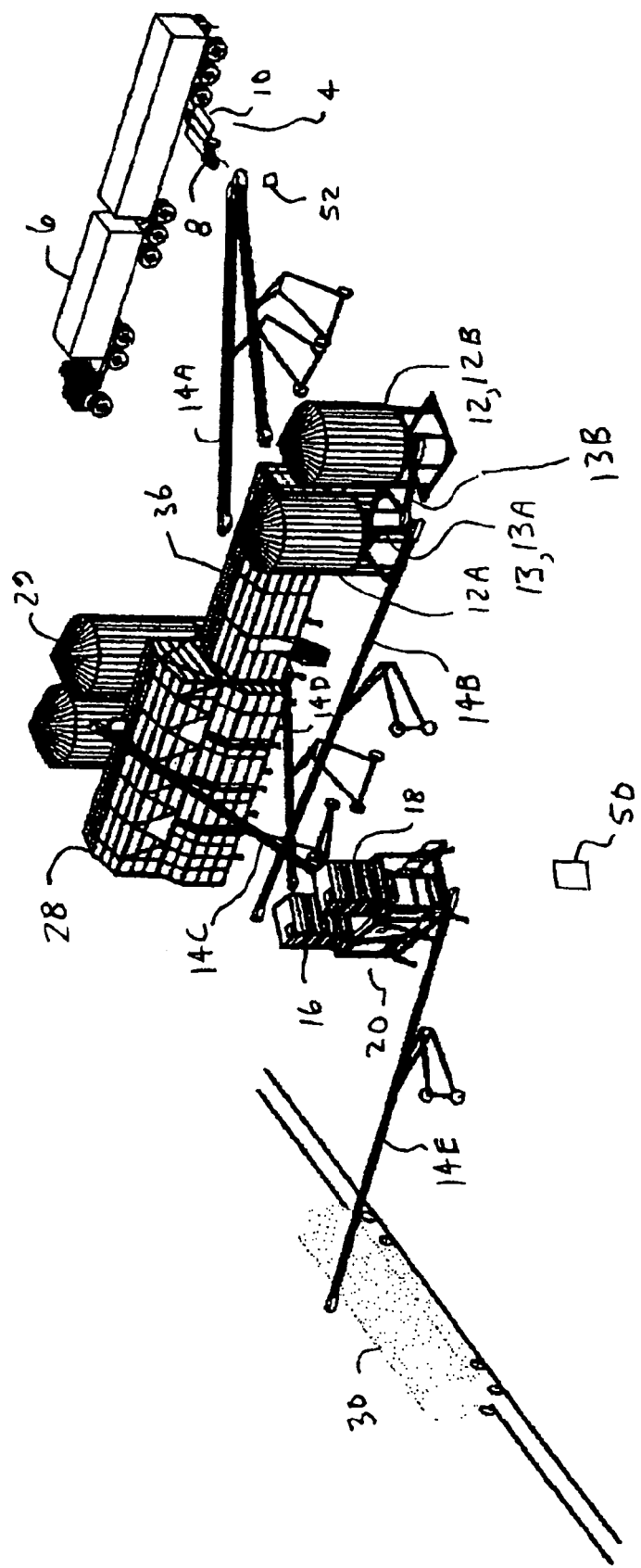
FIG. 1 is a schematic perspective view of a processing plant of the invention set up adjacent to a railway line.

FIG. 1 schematically illustrates a portable processing plant of the invention. The plant comprises a receiving station 4 operative to receive a commodity from trucks 6. Conveniently a portable receiving conveyor 8 with a drive-over intake 10, such as are well known in the art, will provide the receiving station 4. Where the commodities are subject to cracking and breakage, such as is the case with peas, beans, and the like, belt conveyors will be preferred over auger conveyors in order to reduce handling losses.

The commodity is transferred from the receiving station 4 to storage bins 12. Typically two storage bins 12 will be provided, each capable of containing at least one truck load of the commodity being processed. In the illustrated embodiment two portable belt conveyors 14A are oriented to receive commodity from the receiving conveyor 8, and transfer the commodity to one of the storage bins 12. Alternatively a single belt conveyor 14A could receive commodity from the receiving conveyor 8 and have an output that can be selectively directed to one storage bin 12 or the other. With two storage bins 12, one truck load or batch can be transferred into one bin and the next transferred into the other bin while the first bin is being emptied and processed.

Figure 2:
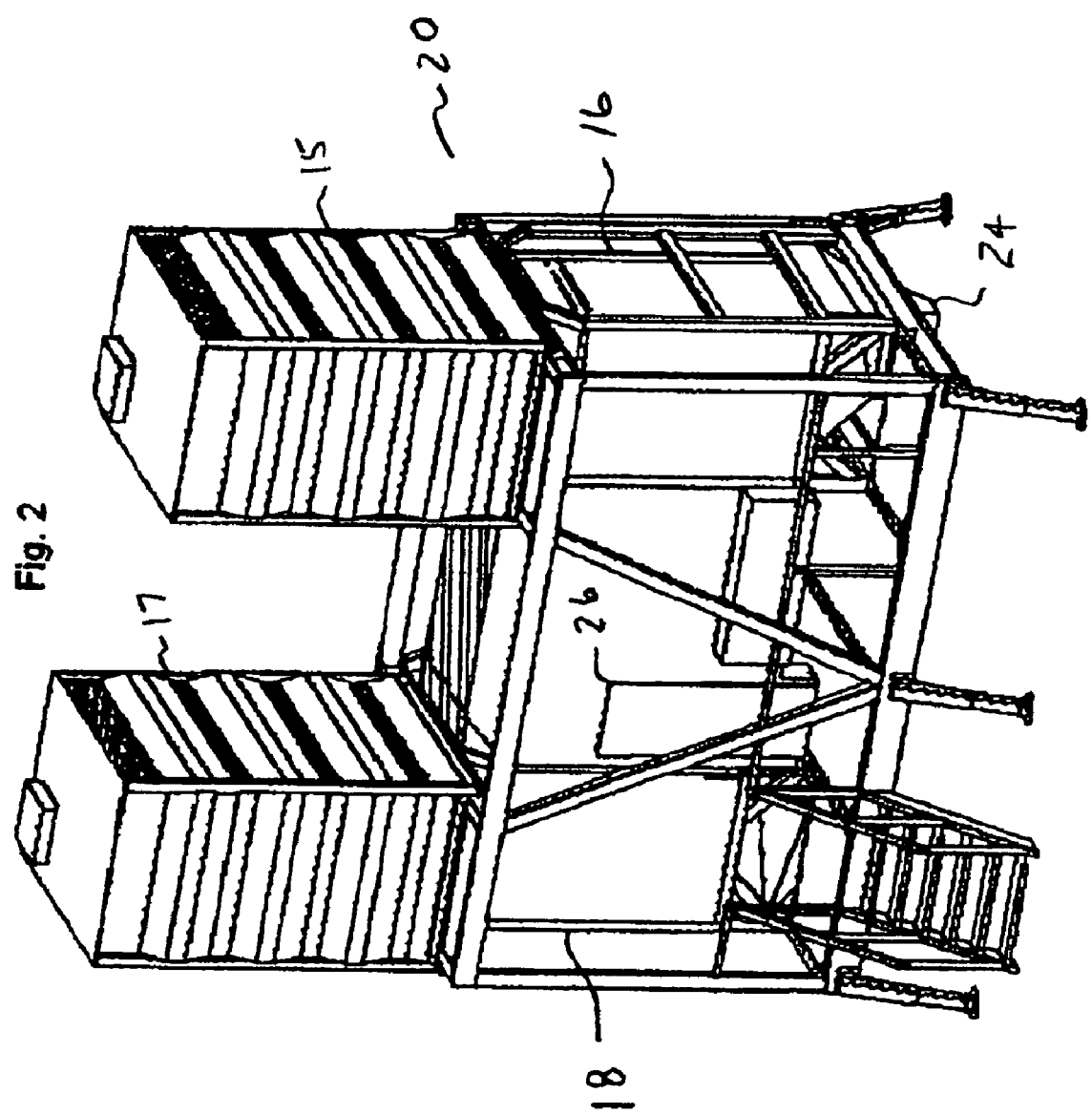
FIG. 2 is a schematic perspective view of the scale module.

In the illustrated embodiment transfer conveyors 13A, 13B are oriented to receive gross commodity from corresponding storage bins 12A, 12B and transfer same to belt conveyor 14B that is oriented to transfer gross commodity received from either of the transfer conveyors 13A, 13B in a gross commodity stream to a receiver comprising a surge bin 15 above gross scale 16 mounted on a scale module 20, as illustrated in FIG. 2. The scale module also comprises a surge bin 17 above net scale 18. The scales 16, 18 weigh the commodity as it moves from the surge bins 15, 17 through the scales to the scale discharges 24 at the bottom thereof.

Such scales are well known in the art, and the type illustrated provides a surge bin 15, 17 at the top thereof that feeds a weighing container at the bottom mounted on load cells that are in communication with the master computer 50. The commodity flows continuously into the top of the surge bins 15, 17 and is weighed in small portions by scales 16, 18 and flows out the output 24 at the bottom of the scales 16, 18 where it enters the intake of a belt conveyor 14 and is transferred away. The scales 16 and 18 operate independently of one another. The scale module 20 also includes a convenient small office 26.

The gross commodity stream flows from the bottom of the gross scale 16 into a belt conveyor 14C and is transferred to the receiver of a cleaning module 28. The cleaning module 28 comprises cleaning equipment suitable for removing dockage from the commodity being processed at relatively high speed such that a continuous stream of gross commodity from the gross scale 18, can be received, cleaned, and directed from the cleaning module 28 to another belt conveyor 14D and into the net scale 18.

The cleaning module 28 comprises cleaning equipment components such as gravity tables, indents, and the like, arranged in series or in parallel as required to achieve the desired degree of dockage removal from any particular commodity at the required capacity. The commodity flows through the cleaning module 28 and a clean commodity stream flows out into a belt conveyor 14D and is transferred to the net scale 18 and out the bottom thereof into a final belt conveyor 14E oriented to discharge into a clean commodity receptacle, illustrated as a grain car 30. The clean commodity receptacle could also be another transport truck, a trailer, a bin, or the like depending on the situation. The dockage that is removed is transferred into dockage bins 29, which may need to be emptied from time to time if considerable dockage is present in the commodity being processed.

Grading samples can be taken at any point after the commodity leaves the cleaning module, conveniently at the exit of the cleaning module 28 or the net scale 18 as the clean commodity stream flows into the intake of one of the belt conveyors 14D, 14E. Conveniently, automatic samplers can be provided to continually draw samples from the output 24 of the gross scale 16 and the net scale 18, and deliver the samples to the office 26 located between the scales 16, 18 which can be manned by grading personnel. The sample from the gross scale 16 can be used for reference if required, while the sample from the net scale 18 will be used for grading purposes.

The plant also includes a service module 36 to house a power plant to power the cleaning equipment or conveyors, as well as such tools, hardware, and the like as might be required for set up and operation of the plant.

The plant is controlled by a master computer 50 that is in communication with and controls each element of the process, as discussed below. Conveniently communication is by wireless connection between the master computer 50 and the various elements.

Each batch of commodity is identified as it arrives as coming from a particular farm location. During the initial negotiations and contracting, each farm location was correlated with a bin of commodity and with an owner and an estimated grade. Typically delivery of commodities will be arranged such that the grade of the commodity arriving at the plant from different farm locations can be estimated to be the same. Thus the batches can be mixed in the commodity receptacles, typically rail cars, which typically will each hold more than one batch of commodity. The identity of the commodity in each car is identified and recorded, and is traceable to the farm locations from which it came.

In operation, a truck carrying a batch of commodity will drive into position at the receiving station 4 to dump the batch into the intake of the receiving conveyor 8. The identity of the commodity batch is entered into the computer 50, via a wireless connection between the master computer 50 and an input device 52 located at the receiving station. The input device can conveniently be incorporated in a handheld computer or the like.

The master computer 50 checks sensors in the storage bins 12, or by like means senses when one of the bins is empty, at which time it will cause the receiving conveyor 8 and an appropriate one of the belt conveyors 14A to start, and the operator at the receiving station 4 will begin dumping the truck 6. For example the batch will be transferred into empty storage bin 12A. The belt conveyor 14A will be operated until empty such that all commodity from the received batch is deposited into the storage bin 12A. Thus the bin 12A contains only commodity from the just received batch which is identified with its source for payment and tracing.

While storage bin 12A is thus being filled, storage bin 12B is being emptied through the belt conveyor 14B in a stream from the storage bin 12B into the surge bin 15 above gross scale 16 and through the system. Once the truck 6 is empty, the driver will move away from the receiving station 4 and be instructed at that time as to which farm location he should next attend to pick up another batch of commodity. Often, by the time a next truck is in position at the receiving station 4 ready to dump another batch of commodity, storage bin 12B will be empty, and the batch from this next truck can be transferred into that storage bin 12B.

Once storage bin 12B has been emptied and the transfer conveyor 13B and belt conveyor 14B are empty as well. The transfer conveyor 13B will be stopped. There will thus be a pause in the flow of commodity into the surge bin 15 above gross scale 16 between the rear end of the stream of one batch and the front end of the stream of the subsequent batch. The master computer 50 will determine that the rear end of the stream of one batch has finished entering the surge bin 15, and will determine an appropriate time to initiate flow of the stream of the next batch.

At the appropriate time, the master computer 50 will cause the transfer conveyor 13A and belt conveyor 14B to start, and begin to transfer the batch of commodity from storage bin 12A into the surge bin 15 above gross scale 16. The process from initiating transfer of the commodity batch into the surge bin 15 is continuous as the commodity flows in a stream from the surge bin 15 through the gross scale 16 through the belt conveyor 14C, then through the cleaning module 28, through the belt conveyor 14D, through the surge bin 17 and net scale 18, through the belt conveyor 14E and into the rail car 30. The system is designed to have a throughput such that a substantially continuous flow of trucks can be unloaded at the receiving station.

The master computer 50 may be configured such that after the rear end of a first commodity batch stream has finished entering the gross scale, the next batch is delayed until the first batch is loaded in the rail car. When the rail car is approaching capacity it may be desirable to deposit the last full batch possible in the rail car 30, and then determine the amount of the next batch that is required to fill the rail car 30. Once the master computer 50 has determined this amount, the appropriate transfer conveyor 13 and belt conveyor 14B can be operated only until the gross scale 16 indicates to the master computer 50 that the correct amount has entered the system, with dockage taken into consideration if significant, and then the transfer conveyor 13 and belt conveyor 14B, and discharge from the bottom of the gross scale 16 will be stopped, and this correct amount will pass through the cleaning module and net scale and be deposited into the rail car.

The full rail car can then be moved away from the discharge of the belt conveyor 14E and an empty car 30 positioned thereunder. At that point the transfer conveyor 13 and belt conveyor 14B, and discharge from the output 24 at the bottom of the gross scale 16 will be resumed and the rest of the batch will be deposited in the next rail car. Thus a batch may be split between two rail cars, however the source of all of the commodity in any rail car 30 is recorded, as well as the weight of the clean commodity derived from each batch.

In order to provide a system that is portable, as required by the method of the present invention, the storage bins 12 and dockage bins 29 are transported lying down and are raised to the operating position at the processing location. The belt conveyors 14 are typically commercially available portable conveyors that are towed along the road and raised to the operating position as required.

Figure 3:
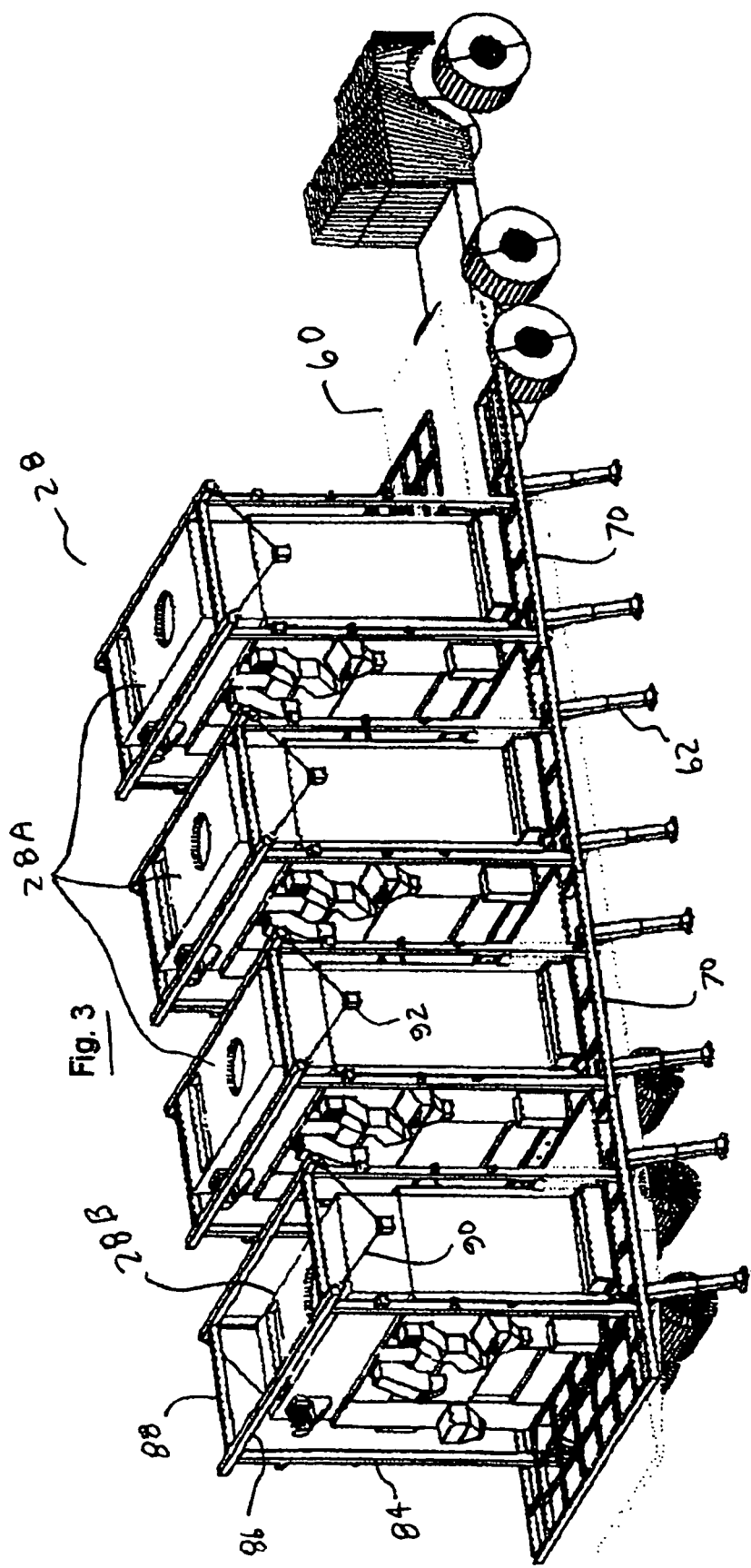
FIG. 3 is a schematic perspective view of the cleaning module and the trailer that carries it.

The scale module 20, cleaning module 28, and service module 36 are each carried on flat deck trailers such as the cleaning module trailer 60 illustrated in FIG. 3. The processing locations where the plant will typically be set up are often uneven and present problems for properly leveling and anchoring the modules, especially the cleaning module 28, for proper operation. The components of the apparatus can be set up in a variety of configurations to suit the site on which same is to be used.

The cleaning module must be of high capacity, similar to or greater than those used in inland terminals. The cleaning equipment in inland terminals can operate 24 hours per day, 7 days a week for long periods by taking raw grain from one storage area, removing the dockage or sizing the product, and then transferring the cleaned grain to another storage area. The equipment in the cleaning module 28 must have sufficient capacity to clean 50 or 100 rail cars of grain in a period of a few days. Anchoring and vibration dampening must be provided for proper operation of the cleaning module 28. All modules must be anchored and then maintained in a level orientation during use.

The cleaning module 28 is illustrated in FIGS. 3-8. In order to facilitate fast and convenient leveling, each module comprises a plurality of individually controlled legs 62 that are jacked down to raise the modules off the trailers 60. Individual leg adjustment allows for leveling of each module on virtually any terrain. The legs 62 also extend slightly outward as well as downward from the modules such that the legs 62 exert a lateral force against each other, thereby stabilizing the modules. Each of the cleaning, scale, and service modules is transported into a desired location relative to the other modules on trailers such as the cleaning module trailer 60, and raised on the legs 62, at which time the trailers may be towed away or left in position as desired.

In conventional commercial facilities, drive-over scales typically weigh the truck before and after unloading to determine the weight of the commodity batch delivered. It is not practical to provide such drive-over scales in a portable plant such as that of the invention, since same must be carefully installed on a prepared level foundation and be inspected in order to be legal for trade. The scale module 20 of the present plant comprises scales of the prior art that are known to transportable from one location to the next and be legal for trade.

The cleaning module 28 illustrated includes three Cimbria Model 108 cleaning mills 28A, each comprising oscillating screens and air aspiration for effective removal of dockage. The three cleaning mills 28A operate in parallel such that the capacity of the cleaning module is three times the capacity of each individual cleaning mill. A somewhat smaller Cimbria Model 107 screenings mill 28B receives the screenings from the three Model 108 cleaning mills 28A and re-cleans the screenings, directing the commodity cleaned out of the screenings back into the clean commodity stream flowing out of the cleaning module 28. The mills 28A, 28B in the illustrated embodiment are sold by are Cimbria Bratney Company of Des Moines, Iowa, however it is contemplated other cleaning mills could be used as well.

Figure 4:
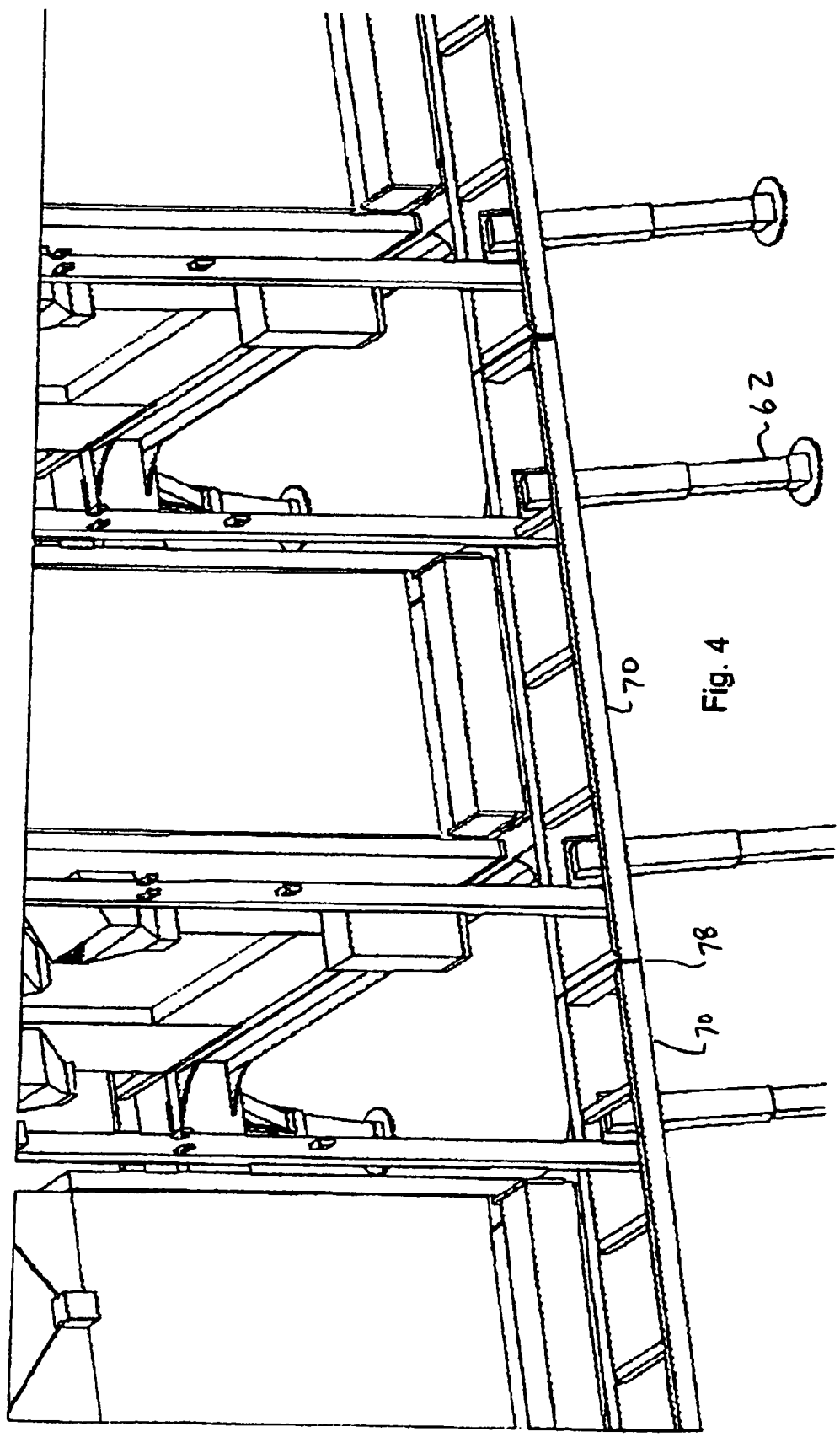
FIG. 4 is a perspective view of the cleaning module showing the individual frames on which the cleaning mills are mounted.
Figure 5:
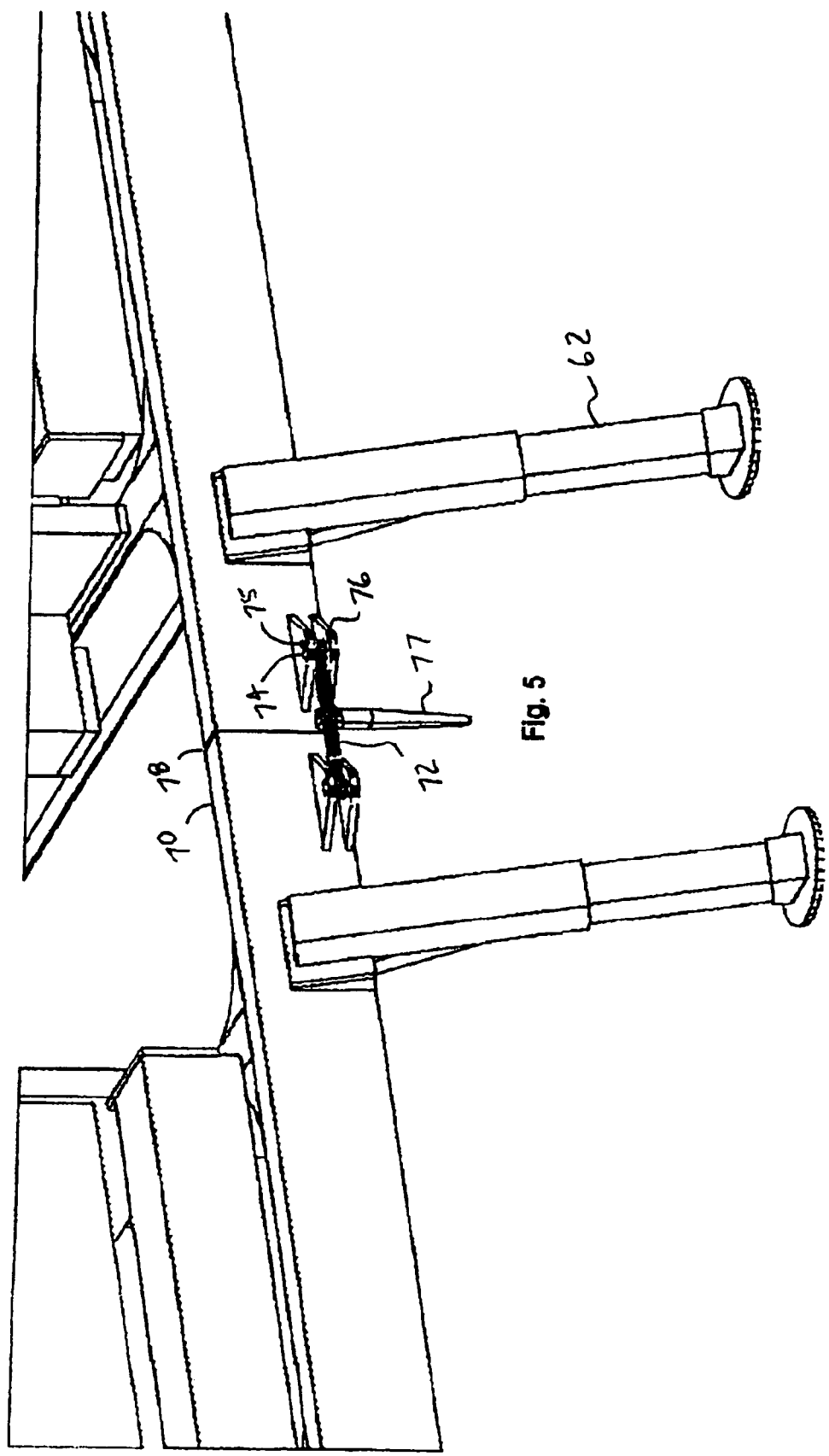
FIG. 5 shows an embodiment of a coupler for use in tying mill frames of the cleaning module together for transport.
Figure 6:
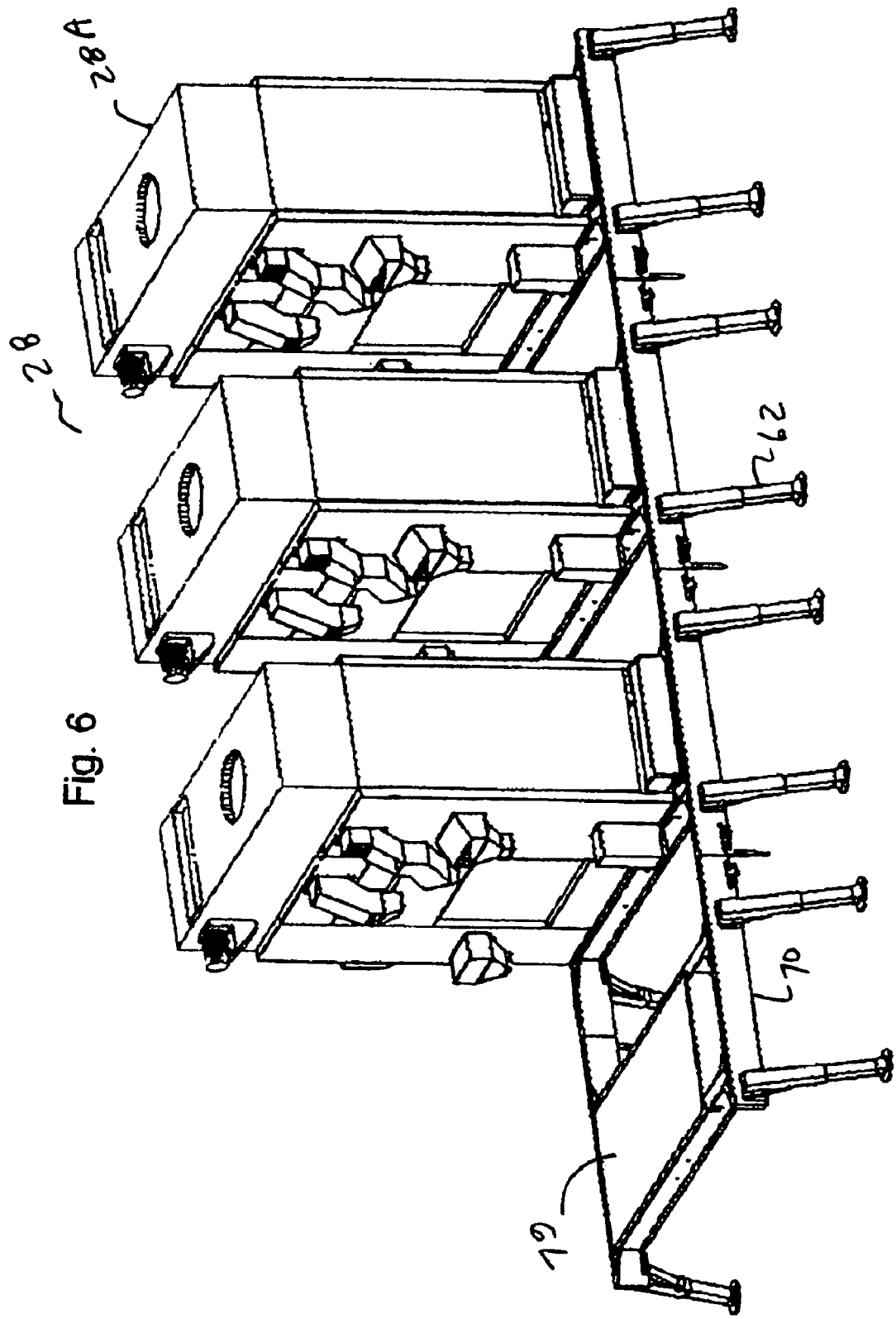
FIG. 6 is a perspective view of the cleaning module showing the concrete slab in the frame that dampens the vibrations from mill operation.

The cleaning module 28 is transported as a single unit on trailer 60, but in operation each mill 28A, 28B is supported on its own respective frame 70, as illustrated in FIG. 4, supported by four legs 62 for leveling and supporting each mill independently. As illustrated in FIGS. 5 and 6, these frames 70 can be held in alignment for transport on the trailer by a coupler 72 in order to maintain their position relative to each other such that same are properly oriented for set up on arrival at a processing site. The frames 70 in FIGS. 5 and 6 are illustrated as having a different configuration than the frames of FIGS. 3, 4, and 7 to illustrate that the frame 70 could be configured in various ways The illustrated coupler 72 is attached to each frame by pins 74 through slotted holes 75 in lugs 76 attached to ends of adjacent frames 70. Operating the ratcheting handle 77 in one direction draws the ends of the frames 70 together to maintain them in an aligned position for transport. Operating the ratcheting handle in the opposite direction moves the pins 74 to opposite ends of the slotted holes 75 and pushes the frames 70 apart. Conveniently a shim is inserted between the ends of the frames 70 for transport, and removed during set up to create a space 78 between the frames 70. Once the frames 70 are spaced the desired distance apart, the pins 74 are then drawn to a loose and neutral position in the middle of the slotted holes 75. It is contemplated that other mechanisms known in the art could well be used to accomplish the required purpose.

Thus the vibrations and oscillations of each mill 28A, 28B are prevented from affecting another by isolating the frames 70, on which the mills 28A, 28B are supported, from each other during operation by providing a space 78 between adjacent frames. The mills 28A, 28B each have an oscillating dynamic load. If they were mounted on a single frame, the oscillations would randomly synchronize and become harmonic. The frame movement resulting from the dynamic load of each individual mill is engineered to be correctly dampened and ballasted by a concrete slab 79, as seen in FIG. 6, in its frame 70, however any harmonic oscillation patterns transferred between frames 70 would upset that balance and create unacceptable random frame vibration and movement which would impact the processing effectiveness. In a conventional cleaning plant the mills are anchored to a building foundation to dampen the load. In this mobile format it is not possible to anchor the mills 28A, 28B to a concrete foundation.

Figure 7:
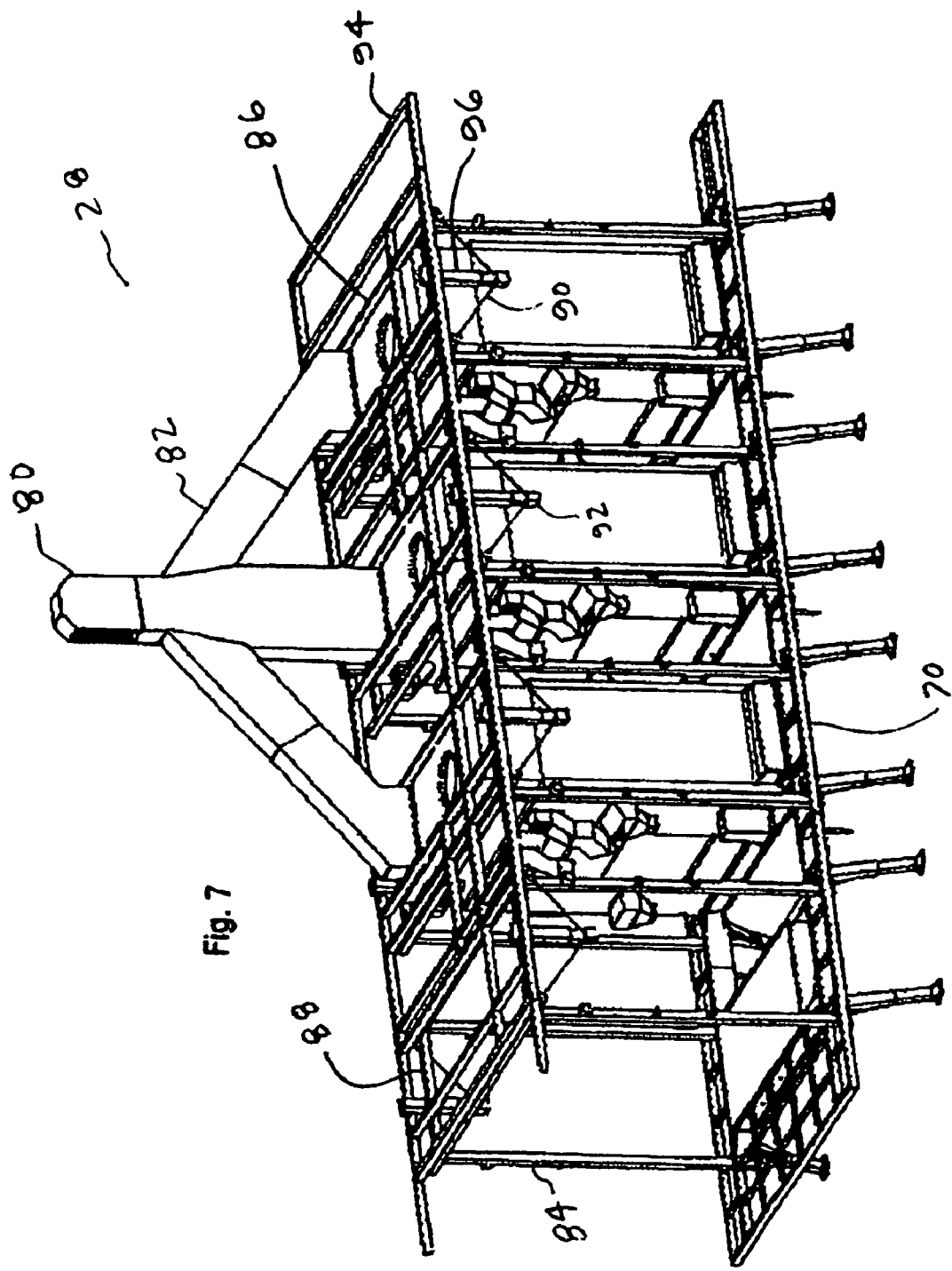
FIG. 7 is a perspective view of the cleaning module showing the plenum feeding the mills, and the roof support structure.

In order to operate the mills 28A in parallel, the flow of commodity from the belt conveyor 14C is divided by providing a distributor in the form of a plenum 80 as illustrated in FIG. 7. Commodity flows into the top of the plenum 80 and out the three output ports 82 to the mills 28A. The flow from the output ports 82 to each mill 28A is controlled to match the flow with the capacity of the mills 28A for any given commodity. The plenum 80 provides surge storage capacity such that the flow of commodity through the plant can be maintained. A sensor on the plenum 80 can detect that the plenum is reaching full capacity. If so, the master computer 50 will reduce flow to the plenum 80. The reduction can be accomplished by, for example, temporarily stopping the flow of commodity from the output 24 of the gross scale 16. The surge bin 15 above the gross scale 16 can at least initially absorb the flow stoppage downstream, and if a sensor therein detects that it is approaching capacity, the master computer 50 can stop the belt conveyor 14A and the appropriate one of the transfer conveyors 13A, 13B. In operation flow will be adjusted to minimize stopping and starting of any conveyors while utilizing the maximum capacity of the cleaning mills.

The plenum 80 must be supported above the cleaning mills 28A, however again care must be taken that vibrations are not transmitted from one mill 28A to another mill 28A. In the illustrated embodiment this is accomplished by providing vertical roof supports 84 on each of the individual frames 70. Lateral cross-members 86 and longitudinal cross-members 88 tie the vertical roof supports 84 on each frame 70 together at top ends thereof. The lateral cross-members 86 extend laterally beyond the vertical roof supports 84 on each side. Cables 90 are attached at one end to the end of each lateral cross-member 86 and at the other end to a block 92 such that the block is suspended on the cables 90 at a location mid-way between the vertical roof supports on each frame.

A roof frame 94 is essentially rigid from one end to the other and includes downward extending suspension members 96. The suspension members 96 are attached at their lower ends to the blocks 92. The roof frame 94 is then suspended on the cables 90 and supported by the vertical roof supports 84. The plenum 80 can then be attached to the roof frame 94, and the roof frame 94 and plenum are insulated from the vibration of the mills 28A by the cables 90. A sheeted roof structure is mounted to the roof frame 94 to protect the mills from the elements.

The roof and plenum are supported on the blocks 92 and isolated from vibration from the mills by cables 90. Alternatively the plenum 80 and roof frame 94 could be mounted on separate vertical supports that extend upward from the ground or from the trailer 60 which can be left under the cleaning module 28 during operation.

The present invention provides a method and apparatus that can move commodities from farm storage, remove the dockage, and load it for shipment all within hours instead of weeks as with a conventional commercial facility. The identity of the commodity is preserved in the rail cars, and the invention allows payment to the farmer based on actual dockage removed from each batch of commodity delivered.

The present invention reduces costs of transporting commodities from the farm to a terminal, since the plant will typically be set up closer to the farms from which it will draw commodity. Handling costs are reduced since once it arrives at the plant, the commodity moves into storage briefly, but after leaving storage as a raw commodity, it is not stored again until in the rail car. Storage costs are therefore negligible. Inventory costs and risk are much reduced since the grain need not be purchased and paid for weeks before payment from the next purchaser in the commodity chain. Infrastructure costs are much reduced, since a major proportion of the costs of conventional commercial facilities is for storage capacity.

Thus the foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A portable processing plant apparatus for receiving gross agricultural commodities and discharging clean agricultural commodities into a clean commodity receptacle, the apparatus, when set up in an operating position, comprising:
   a receiving station operative to receive a gross commodity from a truck;
   a first conveyor operative to convey gross commodity from the receiving station to a selected one of first and second storage bins;
   a second conveyor operative to convey gross commodity in a gross commodity stream from a selected storage bin to a receiver of a gross commodity scale operative to weigh the gross commodity stream as same moves from the receiver to a gross scale discharge;
   a third conveyor operative to convey the gross commodity stream from the gross scale discharge to a receiver of a cleaning module operative to remove dockage from the gross commodity stream and discharge a clean commodity stream at a cleaner discharge thereof and discharge a dockage stream at a dockage discharge thereof;
   a fourth conveyor operative to convey the clean commodity stream from the cleaner discharge to a receiver of a net commodity scale operative to weigh the clean commodity stream as same moves from the receiver to a net scale discharge;
   a fifth conveyor operative to convey the clean commodity stream from the net scale discharge to the clean commodity receptacle;
   a dockage bin connected to receive dockage from the dockage discharge; and
   a computer operative to control flow of a first gross commodity stream from the first storage bin and flow of a second gross commodity stream from the second storage bin to create a gap between a rear end of the first gross commodity stream and a front end of the second gross commodity stream;
   wherein the apparatus is movable from the operating position to a transport position supported on wheels for movement along the ground.

2. The apparatus of claim 1, wherein the computer is further operative to receive identity information from the receiving station corresponding to the gross commodity conveyed to each selected storage bin and record net weight information and clean commodity receptacle information corresponding to the identity information.

3. The apparatus of claim 1, further comprising a sampler operative to draw samples from the clean commodity stream.

4. The apparatus of claim 1, wherein the clean commodity receptacle is one of a rail car, a truck, a trailer, a bin structure.

5. The apparatus of claim 1, wherein the cleaning module comprises a plurality of cleaning mills, each cleaning mill mounted on a frame, and wherein the cleaning module is configured such that when in the operating position the frames are isolated from each other.

6. The apparatus of claim 5, wherein the cleaning mills are mounted on a trailer when in the transport position and each frame comprises extendable legs and actuators operative to extend the legs individually to raise the cleaning mills above the trailer and orient each cleaning mill in a level operating position with a space between the frames of adjacent cleaning mills.

7. The apparatus of claim 6, wherein at least one cleaning mill is dampened and ballasted by a concrete slab mounted in the frame thereof.

8. The apparatus of claim 7, wherein the legs are extendable downward and outward from the frames.

9. The apparatus of claim 5, wherein the cleaning mills are operated in parallel and wherein the receiver of the cleaning module comprises a distributor mounted above the cleaning mills and operative to direct a portion of the gross commodity stream to each cleaning mill.

10. The apparatus of claim 9, wherein the distributor comprises a plenum that includes surge storage capacity.

11. The apparatus of claims 9, wherein the distributor is supported above the cleaning mills by a plurality of cables attached to the frames of the cleaning mills, the cables operative to support the distributor and dampen vibrations from the cleaning mills.

12. The apparatus of claim 9, wherein the cleaning module comprises a roof structure above the cleaning mills and wherein the distributor is mounted to the roof structure.

13. The apparatus of claim 5, wherein the cleaning module includes a screenings mill operative to receive screenings from the plurality of cleaning mills and operative to separate clean commodity from the screenings and operative to discharge the clean commodity into the clean commodity stream and discharge the dockage stream at the dockage discharge, and wherein the cleaning module is configured such that when in the operating position, a frame of the screenings mill is isolated from frames of the cleaning mills.

14. The apparatus of claim 1, wherein the gross commodity scale and the net commodity scale are mounted in a scale module and wherein the scale module comprises extendable legs and actuators operative to extend the legs individually downward and outward to raise the scale module to a level position.

\* \* \* \* \*